May 15, 1923. Re. 15,602
R. B. RESPESS
PROCESS OF MAKING ARTIFICIAL LEATHER
Original Filed June 24, 1919
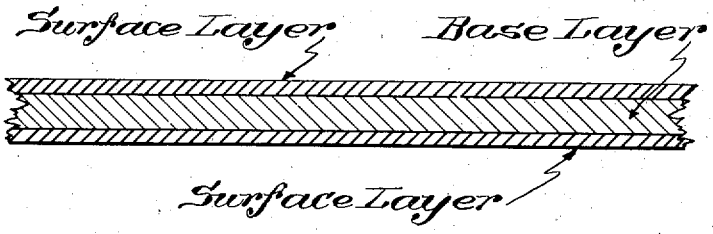
Inventor:
Ridard B. Respess
by Roberts, Roberts & Cushman,
Attys.

Reissued May 15, 1923. Re. 15,602

UNITED STATES PATENT OFFICE.

ROLAND B. RESPESS, OF NEW YORK, N. Y., ASSIGNOR, BY MESNE ASSIGNMENTS, TO RESPRO INC., OF CRANSTON, RHODE ISLAND, A CORPORATION OF RHODE ISLAND.

PROCESS OF MAKING ARTIFICIAL LEATHER.

Original No. 1,416,064, dated May 16, 1922, Serial No. 306,453, filed June 24, 1919. Application for reissue filed April 4, 1923. Serial No. 629,934.

*To all whom it may concern:*

Be it known that I, ROLAND B. RESPESS, a citizen of the United States of America, and a resident of the city, county, and State of New York, have invented new and useful Improvements in Processes of Making Artificial Leather, of which the following is a specification.

This invention relates to process of making artificial leather and relates more particularly to treating a fabric having an unwoven felted fiber structure or a woven fabric having a matted or felted surface on one side of the fabric.

My invention comprises the production of a fabric suitable for artificial leather made in rolls, preferably of fifty yards and upwards in length, from cotton or other fibers made into a felted sheet, or a woven fabric one side of which is felted or has a loose fiber nap, saturating the fiber with a coating binding agent such as a rubber compound or cellulose, drying, pressing the material under tension and finishing one or both sides of the same with a surface dressing to form a fabric resembling leather.

In general terms my fabric is made by taking a suitable sheet of the character described and winding it on a wooden core having a square hole through the center through which a metal bar may be placed, placing the roll of fabric in a machine similar to a doubling or facing machine having two pressure rolls which travel at the same speed, saturating one or both sides of the fabric as it is unwound under tension and pressing the binding solution into the fabric, after which it passes to a drying chamber and the solvent in the binding agent is evaporated. The fabric which comprises the base layer as indicated in section in the accompanying drawing is next subjected to tension and again passed between rolls and pressed. The effect of this operation is to remove the wrinkles in the dried sheet and to prevent their being permanently rolled into the sheet by the final pressing. This process may be repeated to introduce an additional binding agent if desired.

My next step is to coat the prepared fabric with a surface layer of dressing as shown in section in the drawing, though for some purposes the undressed fabric may be used as undressed leather is used in the arts. The surface dressing may be placed on the fabric in the same manner that artificial leather, made of woven cloth is finished, by passing it under a knife in a coating machine and one or more coats be deposited on the side to be coated. Or the fabric may be passed through a calendar machine and a coating of rubber deposited and pressed on its surface. The coated product may be embossed in any design or finished in any color desired.

This treatment will produce a fabric which is compact like leather and of much greater strength than is secured with the felted cloth before it is so treated. The special feature claimed for this product is that by saturating in the manner described, instead of coating the surface in the manner now employed in the manufacture of artificial leathers, the binding-coating agent is pressed into and becomes a part of the fabric and thereafter when the finishing surface coat or coats are applied they adhere more firmly to and become an integral part of the fabric. The invention lies chiefly in the preparation of fabric by pressing some of the binding agent into the fabric by means of pressure rolls and thereafter applying the dressing to the surface in the usual manner.

The binding agent may be composed of cellulose compound, boiled linseed oil, gelatine, rubber or other suitable adhesive agents. One binding agent may be used, if desired, for saturating the fabric and another for the surface dressing or one agent may be employed throughout. When rubber is used as the binding agent or surface dressing, vulcanizing agents are combined with the gum rubber and the product is vulcanized.

The surface dressing may consist of rubber to which a vulcanizing agent may be added.

In referring to felted fabric it is intended to cover fiber batting which has been subjected to the felting process.

What I claim is:

1. The herein described process of making artificial leather consisting in saturating a felted fabric under pressure with a binding agent to form a sheet, drying the sheet, pressing under tension and coating the surface of the sheet with a leather dressing.

2. The herein described process of making an unwoven fabric consisting in forming a matted fiber sheet, saturating the sheet with a binding agent by passing it through pressure rolls to force the binding agent into and throughout the fibers, drying the product, subjecting the dried sheet to tension and pressing under tension between rollers.

3. The herein described process of making an unwoven fabric consisting in forming an interlocked matted fiber sheet, saturating the sheet with a binding agent of rubber compound by passing it through pressure rolls to force the rubber into and throughout the fibers, drying the product, subjecting the dried sheet to tension, pressing the sheet under tension and vulcanizing.

4. The herein described process of making an unwoven fabric consisting in forming a matted fiber sheet, saturating the sheet with a binding agent by passing it through pressure rolls to force the binding agent into and throughout the fibers, drying the product, subjecting the dried sheet to tension and pressing under tension between rollers and coating at least one side of the product with a cellulose compound, linseed oil or other suitable leather dressing.

5. The herein described process of making an unwoven fabric consisting in forming a matted fiber sheet, saturating the sheet with a binding agent of rubber compound by passing it through pressure rolls to force the rubber into and throughout the fibers, drying the product, subjecting the dried sheet to tension, pressing the sheet under tension and vulcanizing and coating the product with a surface dressing of cellulose compound, linseed oil or other suitable leather dressing.

Signed by me at Boston, Massachusetts, this 27th day of March, 1923.

ROLAND B. RESPESS.